United States Patent [19]

Hazelwood, Sr.,

[11] 4,220,257

[45] Sep. 2, 1980

[54] SPRING SEPARATOR

[76] Inventor: John E. Hazelwood, Sr., 2537 Cicero Rd., Noblesville, Ind. 46060

[21] Appl. No.: 928,449

[22] Filed: Jul. 27, 1978

Related U.S. Application Data

[63] Continuation of Ser. No. 506,899, Sep. 17, 1974, abandoned.

[51] Int. Cl.² ............................................. B65H 3/62
[52] U.S. Cl. .................................... 221/156; 198/953
[58] Field of Search .............. 221/202, 203, 201, 156; 198/953; 214/8.5 E; 366/317, 314

[56] References Cited

U.S. PATENT DOCUMENTS

| | | | |
|---|---|---|---|
| 1,524,940 | 2/1925 | Matson | 221/203 |
| 3,042,181 | 7/1962 | Rise | 198/953 X |
| 3,423,075 | 1/1969 | Knudsen et al. | 336/317 |

*Primary Examiner*—Stanley H. Tollberg
*Attorney, Agent, or Firm*—Clarence A. O'Brien; Harvey B. Jacobson

[57] ABSTRACT

A separator for springs and similar parts has a housing provided with an opening for facilitating feeding of tangled springs into the housing. A striker assembly, in the form of a disc arranged opposite the opening in the housing and provided with one or more blades, imparts energy to the tangled springs. The inner surface of the housing has a plurality of protuberances, and the like, for promoting a spinning action of springs energized by the striker assembly. Free fall of tangled springs into the path of the striker blades sets up a natural vibration or oscillation of the tangled springs that, due to the contact angle along the radius of the spring wire, drives them apart. Further, the striker blades impart a rotating motion to the tangled springs in conjunction with the traction imparted to the springs by the protuberances on the inner surface of the housing when the springs come off the striker blades. This rotating motion of the energized springs, which is on an axis parallel to, or at the center of, the radius of coils of the springs, rotates one spring out of another spring with which the coils of the one spring are wound.

22 Claims, 4 Drawing Figures

SPRING SEPARATOR

This is a continuation of application Ser. No. 506,899, filed Sept. 17, 1974, now abandoned.

BACKGROUND OF THE INVENTION

1. Field of the Invention

This invention relates generally to a parts separator, and particularly to a device for separating springs and spring-like parts that are tangled in normal shipping, storage, during automated parts handling, and when used with automated assembling devices.

2. Description of the Prior Art

It is known generally to separate tangled springs, and the like, by passing the springs into the path of a multi-blade rotor which strikes the tangled springs and disengages them. U.S. Pat. No. 3,042,181, issued July 3, 1962 to William E. Rise, discloses a tangled spring separator wherein the springs are fed into a vibrating hopper. A rotor is arranged in one part of the hopper, and tangled springs are directed into the path of the rotating blades of the rotor so that the tangled springs are disengaged.

SUMMARY OF THE INVENTION

It is an object of the present invention to provide a separator for springs and spring-like parts which is simple yet rugged in construction, and reliable in operation.

It is another object of the present invention to provide a device for separaing springs, or spring-like parts, that are coiled, or wound, together, as well as mashed together.

It is yet another object of the present invention to provide a spring separator capable of separating various sizes of springs and spring-like parts.

It is a still further object of the present invention to provide a spring separator capable of independent use or use with automated assembling devices.

These and other objects are achieved according to the present invention by providing a spring separator having: a housing provided with an opening for feeding tangled parts into the housing; a striker assembly arranged in the housing for imparting energy to the parts; and a traction surface provided in the housing for promoting a spinning action among parts energized by the striker assembly.

A preferred embodiment of a striker assembly according to the present invention has a disc rotatably mounted for substantially covering an associated wall of the housing, with at least one, and advantageously a plurality, of blades being mounted on the disc for rotation therewith. The housing advantageously has a pair of opposed walls, with the opening being provided in one of the opposed walls and the disc being arranged adjacent to and covering the other of the opposed walls for preventing parts from being jammed between the blades and housing. The blades extend into the housing toward the one of the opposed walls. When the housing is a hollow cylinder having a cylindrical wall, the opposed walls then being the end walls of the cylinder, the traction means includes protuberances on the inner surface of th cylindrical wall. These protuberances, which may be knurling and the like, are arranged extending into the housing for facilitating rotation of tangled parts one out of the other.

An aperture is advantageously provided in the cylindrical wall adjacent the one of the opposed walls wherein the intake opening is arranged for permitting egress of untangled springs and similar parts from the housing.

A separator according to the present invention untangles springs, and the like, by allowing the tangled parts to fall freely through the opening onto the striker assembly. The latter imparts a striking force to the parts which energizes same and sets up a natural vibration, or oscillation, of the parts that drives them apart. Simultaneously to this energizing of the parts, the parts are set into a rotating motion enhanced by the provision of the traction caused by the protuberances on the inner wall of the separator housing whereby the parts are rotated out of one another. The latter action is particularly advantageous for unwinding the coils of coiled springs that have become wound into one another.

These together with other objects and advantages which will become subsequently apparent reside in the details of construction and operation as more fully hereinafter described and claimed, reference being had to the accompanying drawings forming a part hereof, wherein like numerals refer to like parts throughout.

DESCRIPTION OF THE PREFERRED EMBODIMENTS

Figure 1:
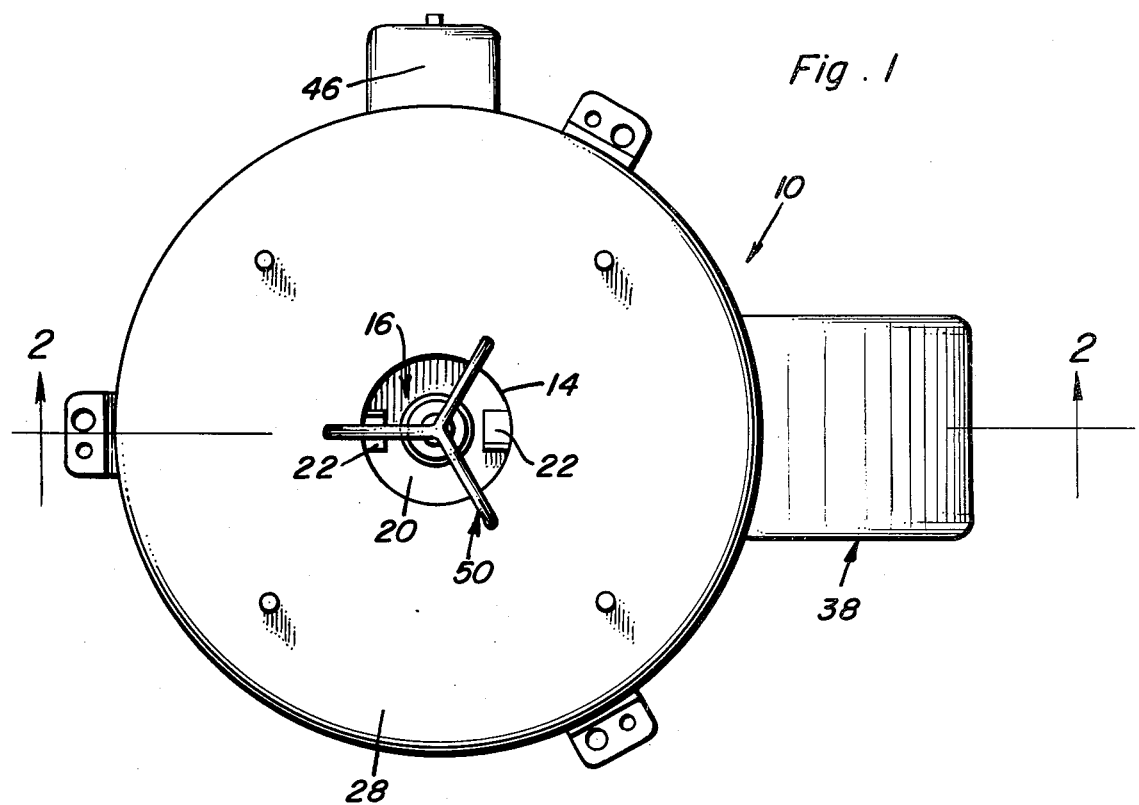
FIG. 1 is a top plan view of one embodiment of a spring separator according to the present invention.
Figure 3:
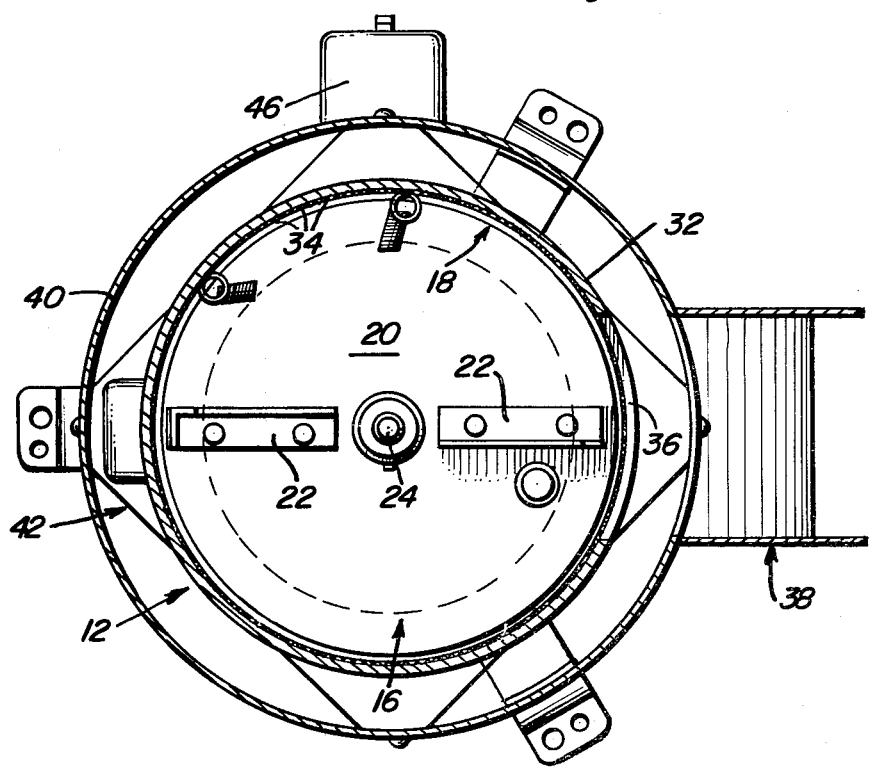
FIG. 3 is a sectional view taken generally along the line 3—3 of FIG. 2, but drawn to the same scale as FIG. 1.
Figure 2:
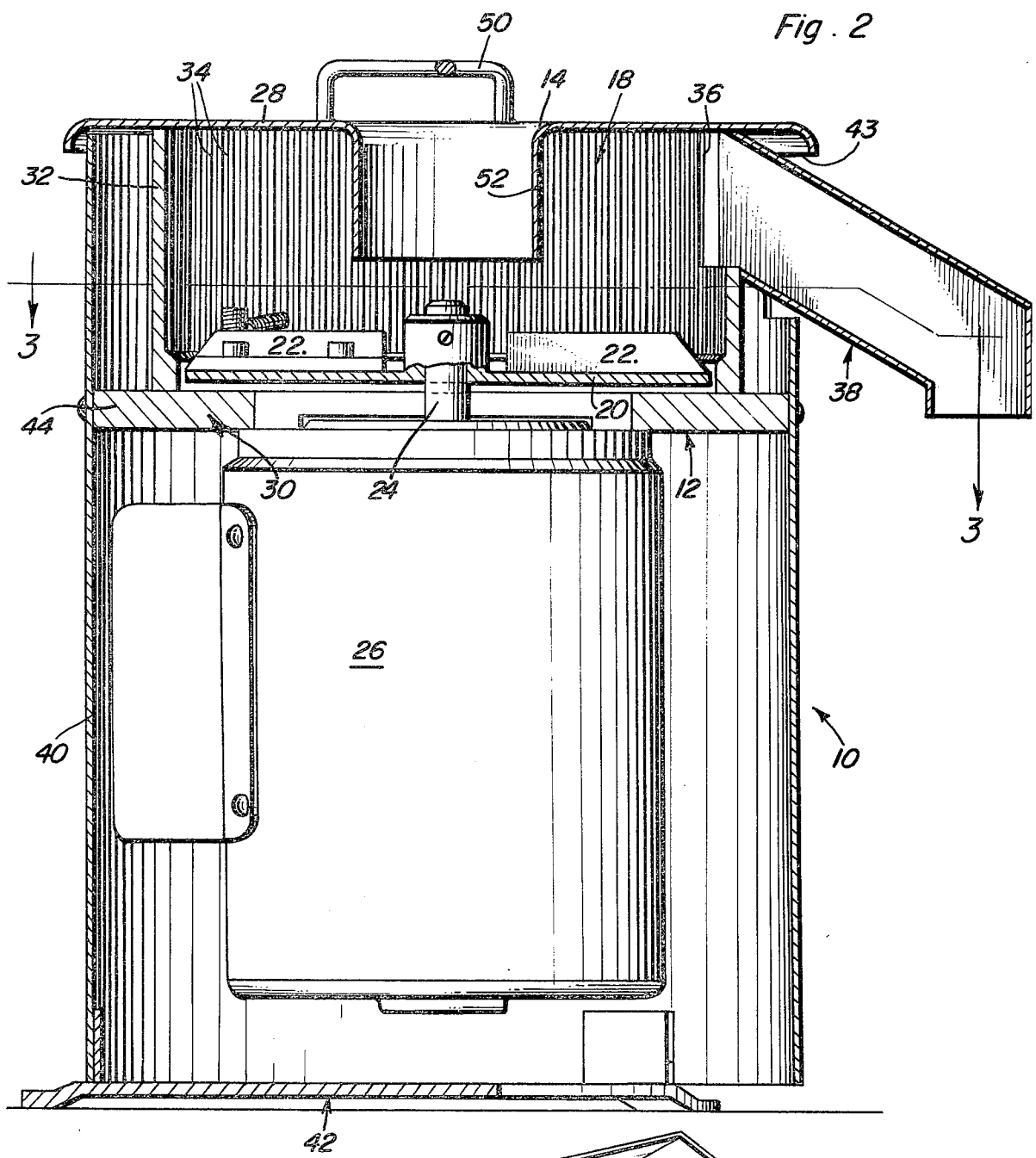
FIG. 2 is a sectional view taken generally along the line 2—2 of FIG. 1, but drawn to a larger scale than FIG. 1.

Referring now more particularly to the embodiment shown in FIGS. 1 through 3 of the drawings, a parts separator 10 has a housing 12 provided with an opening 14 arranged for facilitating feeding of tangled parts, such as the illustrated coiled springs, into housing 12. A striker assembly 16 is arranged in housing 12 for imparting energy to the parts, while a traction surface 18 is provided on a wall of the housing for promoting a spinning action of parts energized by assembly 16.

Striker assembly 16 advantageously includes a disc 20 rotatably mounted in housing 12 for substantially covering an associated wall of the housing. A plurality of blades 22 are shown as mounted on disc 20 for rotation therewith. Disc 20 is itself mounted on a shaft 24 of a motor 26, which may be a conventional electric motor as commonly used for such purposes, so that rotation of shaft 24 will rotate disc 20. Desirably, housing 12 has a pair of opposed walls 28 and 30, with opening 14 being provided in wall 28 and disc 20 being arranged adjacent to and covering wall 30 for preventing parts from being jammed between the blades 22 and housing 12. Blades 22 extend into housing 12 toward wall 28 and its associated opening 14.

Desirably, housing 12 is the illustrated hollow cylinder having a cylindrical wall 32, with the opposed walls 28 and 30 being the end walls of the cylinder. The traction surface 18 is in this instance formed by a plurality of protuberances 34 provided on an inner surface of the cylindrical wall 32. These protuberances 34 extend into housing 12 for facilitating rotation of tangled parts one out of the other. According to a preferred construction of the present invention, the cylindrical wall 32 may be knurled in a conventional manner, whereby the thus provided knurls form protuberances 34.

Alternatively, a resilient material (not shown), such as natural or synthetic rubber, may be, for example, bonded to the wall 32 to form the traction surface.

An aperture 36 is provided in cylindrical wall 32 adjacent wall 28 of the hollow cylinder for permitting egress of untangled parts from housing 12. A discharge chute 38 is associated with aperture 36 for guiding the parts into a collecting container (not shown), and the like.

An enclosure 40, which may be in the form of a sleeve, is shown in FIGS. 1 through 3 as surrounding housing 12 and motor 26. A base 42 is connected to the lower end of enclosure 40 for facilitating support of separator 10. As will be appreciated, the feet portion of base 42 may be secured to a suitable support, such as a workbench, as by conventional screw fasteners, and the like, not shown. As can be readily appreciated from FIG. 2 of the drawings, wall 28 is advantageously constructed in the form of a cover provided with opening 14 and arrangeable not only covering the upper end of housing 12, but also covering the upper end of enclosure 40. Further, enclosure 40 is provided with an opening 43 which permits chute 38 to communicate with aperture 36 provided in housing 12.

Motor 26 is advantageously mounted on enclosure 40 as by a conventional bracket 44. A motor switch 46, which is likewise conventional, is advantageously mounted on the outside of enclosure 40, and power is provided to motor 26 from a conventional power source, not shown, by wiring also not shown. It will be understood, however, that the wiring of motor switch 46 and motor 26 is of a conventional nature and is commonly used for energizing electric motors, and the like. It will also be appreciated that other suitable motors, such as fluid motors, may be used as motor 26 instead of an electric motor. If, for example, a fluid motor is used as motor 26, suitable fluid hoses, and the like, will run into enclosure 40 to the motor in a manner well known to those in the particular art.

When the protuberances 34 are formed by knurling, for example, straight knurling of approximately, for example, sixteen lines per inch about, for example, 0.015 inches deep has been found satisfactory.

A spider 50 is advantageously arranged surrounding and above opening 14 for facilitating in dividing springs dropped through opening 14 into housing 12. Further, a tube 52 desirably extends from opening 14 and its associated wall 28 toward striker assembly 16 for guiding the tangled parts onto the disc 20 and into the path of blades 22.

Figure 4:
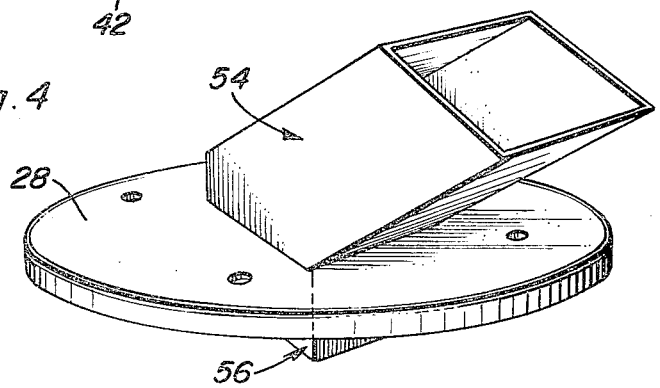
FIG. 4 is a perspective view showing a modified cover arrangement for a spring separator according to the present invention.

FIG. 4 shows a wall 28, which as stated above also forms a cover for the separator, which has in place of opening 14, spider 50, and tube 52, a guide chute 54 communicating with a guideway 56 beneath the wall 28. It will be understood that a suitable opening (not shown) places chute 54 in communication with guideway 56. This arrangement is advantageous when using a separator according to the present invention in conjunction with automated assembling devices which are known per se, and accordingly not disclosed herein. The chute 54 facilitates attachment of the separator to the associated assembly equipment, while guideway 56 functions in a manner similar to tube 52.

A separator according to the present invention operates to separate spring and spring-like parts in one or both of the following ways:

1. Tangled springs and similar parts are allowed to free fall through opening 14 and be struck by the rotating blade or blades 22. The striking forces, or energies, imparted to the parts set up a natural vibration, or oscillation, of the tangled springs, or other parts, that, due to the contact angle along the radius of the spring wire, drives the parts apart. The same separating forces are transferred to tangled springs, and the like, by propelling them against a solid object.

2. Tangled springs, and similar parts, are allowed to free fall and be struck by rotating blade or blades 22 and the striking forces, or energies, imparted to the parts sets up a rotating motion of the spring part on an axis parallel to or at the center of the radius of the coils of the springs. This rotating motion of the springs rotates one spring out of the other. The traction surface 18 aids the spinning action desired to achieve this separation. Thus, the feature of providing a traction surface permits the separation of springs, or spring-like parts, that are coiled together; that is, two or more springs that are rotated or wound into each other, not just mashed together.

As can be appreciated from the above description and from the drawings, a separator according to the present invention provides a manual or automatic feed device having the capability to entangle springs or spring-like parts and return them to an operator or to a further processing device.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention.

What is claimed as new is as follows:

1. A parts separator for separating coiled springs and spring-like parts, comprising, in combination:
   (a) a housing provided with an inlet opening for feeding tangled parts into the housing;
   (b) a striker means arranged in the housing for imparting energy to the parts;
   (c) traction means comprising protuberances on the inner surface of the housing for promoting a spinning action of parts energized by the striker means;
   (d) the striker means including a disc rotatably mounted and arranged for substantially covering an associated wall of the housing, and at least one blade mounted on the disc for rotation therewith; and
   (e) the housing having a pair of opposed walls, with the inlet opening being provided in the first opposed wall and the disc being arranged adjacent to and covering the second opposed wall for preventing parts from being jammed between the blade and the housing, the blade extending into the housing toward the first opposed wall and toward the opening provided therein.

2. A structure as defined in claim 1, wherein the housing is a vertical hollow cylinder having a cylindrical wall, the opposed walls being end walls, and wherein the traction means includes protuberances on an inner surface of the cylindrical wall, the protuberances extending into the housing for facilitating rotation of tangled parts one out of the other.

3. A structure as defined in claim 2, wherein the inner surface of the cylindrical wall is knurled, the thus provided knurls forming the protuberances.

4. A structure as defined in claim 3, wherein the knurls are formed by straight knurling of approximately 16 lines per inch and about 0.015 inches deep.

5. A structure as defined in claim 2, wherein an aperture is provided in the cylindrical wall for permitting egress of untangled parts from the housing.

6. A structure as defined in claim 5, wherein the egress aperture is adjacent to the second opposed wall.

7. A structure as defined in claim 6, and further including an inlet guiding means which comprises a tube having one end contiguous with the inlet opening and which extends inwardly into the housing.

8. A structure as defined in claim 7 and further including dividing means which comprises a spider having a plurality of legs, the outer ends of which are attached to the housing, and which is located surrounding and above the inlet opening, for facilitating in dividing tangled parts fed into the housing.

9. A structure as defined in claim 2, wherein the inlet opening is circular and coaxial with the cylinder.

10. A structure as defined in claim 1, wherein the striker means disc has two blades.

11. A structure as defined in claim 2, wherein the striker means disc rotates about its midpoint, which is coaxial with the cylinder.

12. A structure as defined in claim 1, wherein the housing is a vertical hollow cylinder having a cylindrical wall, the opposed walls being end walls, and wherein the traction means includes a resilient material bonded to the inner surface of the cylinder wall, to form a traction surface for facilitating rotation of tangled parts one out of the other.

13. A structure as defined in claim 12, wherein the resilient material is natural or synthetic rubber.

14. A parts separator for separating coiled springs and spring-like parts, comprising, in combination:
 (a) a hollow vertical cylindrical housing provided with an inlet opening for feeding tangled parts into the housing;
 (b) a striker means arranged in the housing for imparting energy to the parts; and
 (c) traction means for promoting a spinning action of parts energized by the striker means, comprising a plurality of protuberances provided on an inner surface of the vertical cylindrical wall, the protuberances extending into the housing around substantially the entire inner periphery of the cylindrical wall for facilitating rotation of tangled parts one out of the other.

15. A parts separator for separating coiled springs and spring-like parts, comprising, in combination:
 (a) a hollow cylindrical housing provided with an inlet opening for feeding tangled parts into the housing;
 (b) a striker means arranged in the housing for imparting energy to the parts; and
 (c) traction means for promoting a spinning action of parts energized by the striker means comprising a plurality of protuberances which are knurls provided on an inner surface of the cylindrical wall, the protuberances extending into the housing for facilitating rotation of tangled parts one out of the other.

16. An apparatus for separating randomly entwined coiled springs and delivering the springs one by one comprising: a housing having a bottom and a curved side wall defining a generally cylindrical vertical chamber having an inlet opening for feeding tangled springs into the housing; an impact member having elongated portions extending at least partially across said chamber and closely overlying said bottom; means for rotating said impact member about its midpoint; said side wall having an irregular inner surface extending substantially about its periphery; a discharge opening in the side wall spaced above said impact member; rotation of the impact member moving the springs within the chamber; said springs engaging the side wall surface and thereafter being discharged outwardly through said discharge opening.

17. The apparatus of claim 16, wherein the impact member is mounted on a disc for rotation therewith; and the housing having a pair of opposed walls with the inlet opening being provided in one of the opposed walls and the disc being arranged opposite the inlet opening.

18. An apparatus for separating randomly entwined coiled springs and delivering the springs one by one comprising: a housing having a bottom and a curved side wall defining a generally cylindrical vertical chamber having an inlet opening for feeding tangled springs into the housing; an impact member having elongated portions extending at least partially across said chamber and closely overlying said bottom; means for rotating said impact member about its midpoint; said side wall having a mechanically roughened surface extending substantially about its periphery; a discharge opening in the side wall spaced above said impact member; rotation of the impact member moving the springs within the chamber; said springs engaging the side wall surface and thereafter being discharged outwardly through said discharge opening.

19. A method for separating tangled parts such as coiled springs and spring-like parts, comprising the steps of:
 (a) allowing tangled parts to free fall onto a striker assembly;
 (b) striking the falling parts with the striker assembly to energize the parts and set up a natural vibration therein; and
 (c) impinging the energized parts upon a stationary traction surface comprising a plurality of protuberances arranged around substantially the entire outer periphery of the striker assembly to impart a rotating motion and facilitate in rotating one tangled part out of an other.

20. The method of claim 19 wherein the tangled parts are coiled springs.

21. The method of claim 20 wherein the traction surface comprises the inner wall of a vertical cylinder, the bottom of the cylinder comprises the striker assembly, and the tangled parts are introduced through the top of the cylinder.

22. The method of claim 21 wherein the separated springs are continuously removed by allowing them to pass through an outlet aperture in the cylinder wall and additional tangled springs are continuously introduced through the top of the cylinder.

* * * * *